United States Patent [19]

Halverson et al.

[11] Patent Number: 4,605,440
[45] Date of Patent: Aug. 12, 1986

[54] BORON-CARBIDE-ALUMINUM AND BORON-CARBIDE-REACTIVE METAL CERMETS

[75] Inventors: Danny C. Halverson, Manteca, Calif.; Aleksander J. Pyzik; Ilhan A. Aksay, both of Seattle, Wash.

[73] Assignee: The United States of America as represented by the United States Department of Energy, Washington, D.C.

[21] Appl. No.: 730,528

[22] Filed: May 6, 1985

[51] Int. Cl.$^4$ ............................................. C22C 29/04
[52] U.S. Cl. ........................................ 75/238; 75/230; 75/236; 75/241; 75/244; 419/12; 419/14; 419/15; 419/23; 419/34; 419/38; 419/40; 419/47; 501/87; 501/93; 501/96; 501/98; 423/289; 423/439
[58] Field of Search ................... 419/12, 14, 15, 23, 419/34, 40, 38, 47; 75/238, 230, 236, 241, 244; 501/87, 93, 96, 98; 423/289, 439

[56] References Cited

U.S. PATENT DOCUMENTS

| | | | |
|---|---|---|---|
| 2,746,133 | 5/1956 | Lowe | 75/238 |
| 3,178,807 | 4/1965 | Bergmann | 75/238 |
| 3,749,571 | 7/1973 | Stibbs et al. | 75/238 |
| 4,104,062 | 8/1978 | Weaver | 75/238 |

Primary Examiner—Stephen J. Lechert, Jr.
Attorney, Agent, or Firm—Henry P. Sartorio; L. E. Carnahan; Judson R. Hightower

[57] ABSTRACT

Hard, tough, lightweight boron-carbide-reactive metal composites, particularly boron-carbide-aluminum composites, are produced. These composites have compositions with a plurality of phases. A method is provided, including the steps of wetting and reacting the starting materials, by which the microstructures in the resulting composites can be controllably selected. Starting compositions, reaction temperatures, reaction times, and reaction atmospheres are parameters for controlling the process and resulting compositions. The ceramic phases are homogeneously distributed in the metal phases and adhesive forces at ceramic-metal interfaces are maximized. An initial consolidation step is used to achieve fully dense composites. Microstructures of boron-carbide-aluminum cermets have been produced with modulus of rupture exceeding 110 ksi and fracture toughness exceeding 12 ksi$\sqrt{}$in. These composites and methods can be used to form a variety of structural elements.

42 Claims, 6 Drawing Figures

4,605,440

BORON-CARBIDE-ALUMINUM AND BORON-CARBIDE-REACTIVE METAL CERMETS

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

This invention relates generally to boron-carbide-aluminum and other boron-carbide-metal compositions of matter and, more particularly, to boron-carbide-aluminum cermets and other boron-carbide-reactive-metal cermets.

U.S. Pat. No. 2,746,133 by Lowe, U.S. Pat. No. 3,178,807 by Bergmann, U.S. Pat. No. 3,364,152 by Lipp, and U.S. Pat. No. 4,104,062 by Weaver all pertain to boron-carbide-aluminum composites and their manufacture. However, these patents do not show specific cermet compositions or methods for producing directly usable consolidated cermet bodies.

Monolithic ceramic materials have historically been limited in their application as structural materials. This is due to their inherent failure mechanisms which make them very susceptible to microstructural defects such as cracks or voids. One measure of a material's resistance to this type of failure is fracture toughness. Conventional ceramics have low fracture toughness.

One way to increase fracture toughness is through the addition of another ceramic phase, e.g., $Al_2O_3$-$B_4C$ composites, or by the addition of a metal phase, e.g., $B_4C$-metal cermets. A cermet is defined as a ceramic-metal composite such that the final microstructure is more than 50 vol. % ceramic phases.

FIG. 1 illustrates the tradeoff of increasing fracture toughness at the expense of increasing specific gravity for some conventional monolithic ceramic materials and a conventional cermet (TiC-Ni-Mo). FIG. 1 also shows how it is possible to move away from the trend of increasing fracture toughness with increasing specific gravity by using selected ceramic-ceramic composites (i.e., $Al_2O_3$-$B_4C$) and to a much greater extent by employing selected ceramic-metal composites, in accordance with the present invention, in particular $B_4C$-Al or other $B_4C$-metal cermets.

Accordingly, it is an object of the invention to provide boron-carbide-aluminum and other boron-carbide-reactive metal cermet compositions.

It is also an object of the invention to provide methods for forming boron-carbide-aluminum and other boron-carbide-reactive metal cermet compositions.

It is another object of the invention to provide boron-carbide-aluminum and other boron-carbide-reactive metal cermet composites with tailorable microstructures and methods for forming same.

It is a further object of the invention to provide boron-carbide-aluminum and other boron-carbide-reactive metal cermet compositions which are fully dense, and methods for forming same.

It is another object of the invention to provide articles of manufacture made from fully dense boron-carbide-aluminum and other boron-carbide-reactive-metal cermet composites.

It is also an object of the invention to provide methods for making boron-carbide-aluminum and other boron-carbide-reactive metal cermet compositions, and articles of manufacture thereof at relatively low cost.

SUMMARY OF THE INVENTION

The present invention provides a whole spectrum of specific compositions of boron-carbide-aluminum and other boron-carbide-reactive-metal cermets and methods which apply basic thermodynamic and kinetic principles to achieve these boron-carbide-aluminum and boron-carbide-reactive-metal cermets. The invention includes a plurality of multiphase cermet compositions, including fully dense microstructures, and methods for selectively producing the desired compositions.

According to the invention, there are three major steps in the formation of these compositions of matter.

First, the capillarity thermodynamic criteria of achieving a rapid consolidation through the wetting of the boron-carbide phase by the metal must be achieved. In addition, wetting is generally indicative of an interfacial reaction between the boron-carbide phase and metal phase. Not all metals react with the boron-carbide (i.e., wet boron-carbide) and hence this invention is only applicable to metals which are suitable reactants with boron-carbide. Metals of this type include Al, As, Ba, Be, Ca, Co, Cr, Fe, Hf, Ir, La, Li, Mg, Mn, Mo, Na, Nb, Ni, Os, Pd, Pt, Pu, Re, Rh, Ru, Sc, Si, Sr, Ta, Tc, Th, Ti, U, V, W, Y, and Zr, and any alloys thereof, or compounds thereof which are reduced to the metallic form during processing. The most preferred metal is Aluminum.

The second step is to apply reaction thermodynamic criteria to the boron-carbide-metal compositions in order to achieve desired reaction products in the microstructure. Through this step, it is possible to take the wetted-boron-carbide-metal compositions of step one and react them to specific end products which result in tailored microstructures. It is also possible to completely react all of the metal or alloy phase and any metastable phases which form during these processes to achieve a composite material which is completely without any metal phase or any phase representative of the initial starting constituents. That is, it is possible to go from any ceramic-metal starting composition and end up with a cermet or ceramic-ceramic composite.

The third step is to apply the kinetics of how these boron-carbide-reactive-metal composites consolidate during the above processes in order to select the appropriate method of manufacture. Consolidation involves the application of temperature to these bodies such that they will sinter. It may also involve the application of pressure with temperature in order to assure that fully dense final products are obtained. However, it is particularly preferred to apply colloidal consolidation techniques, which form a part of the invention, to eliminate the application of pressure and yield final products with negligible or no porosity at reduced processing expense.

DETAILED DESCRIPTION OF THE INVENTION

Aluminum is a compatible metal phase for the development of $B_4C$-Al cermets because it is reactive with boron-carbide. Aluminum is a terrestrially stable metal phase with a low specific gravity. It is also ductile, nontoxic, relatively inexpensive, easy to obtain, and available in corrosion-resistant forms.

Boron-carbide-aluminum cermets, and alloys thereof, offer a combination of high hardness and toughness in a lightweight structure. Since boron carbide is an excellent neutron absorber these cermets will also be excellent neutron absorbers.

Boron-carbide-aluminum composites and their alloys, combine the useful properties of ceramic and metal materials into one system. In particular, these composites offer properties that can be controlled through various processing routes to obtain high modulus, high hardness, low density, and high fracture toughness.

Potential applications of boron-carbide-aluminum composites and their alloys include, but are not limited to, lightweight structures, cutting tools, spent nuclear fuel containers, radiation resistant structures, hot and cool parts of turbine engines, impact resistant structures, abrasive and wear resistant materials, semiconducting devices, and structures requiring increased thermal shock resistance and a high degree of chemical stability. With a continuous metal phase, this composite yields materials where ductility and a thermally and/or an electrically conducting matrix are required.

The invention is described primarily with respect to Aluminum, but applies to and includes other metals which react with boron-carbide, using the same methods, to form similar composites or cermets. These metals include As, Ba, Be, Ca, Co, Cr, Fe, Hf, Ir, La, Li, Mg, Mn, Mo, Na, Nb, Ni, Os, Pd, Pt, Pu, Re, Rh, Ru, Sc, Si, Sr, Ta, Tc, Th, Ti, U, V, W, Y, and Zr. In addition, alloys of these metals can be utilized as well as compounds thereof which are reduced to the metallic form during processing.

The methods for forming composites of boron-carbide with aluminum or other reactive metals, and the compositions formed, are described in the following. The methods include three principal steps, including (1) consolidation or preparation of the starting materials, (2) producing the right capillarity-thermodynamic condition or wetting the starting materials, (3) reacting the starting materials to produce the desired compositions. Although the consolidation step is performed before the other two steps, the wetting and reaction steps are described first since they impose certain requirements which must be met in the consolidation step.

Capillarity Thermodynamics

Figure 2A:
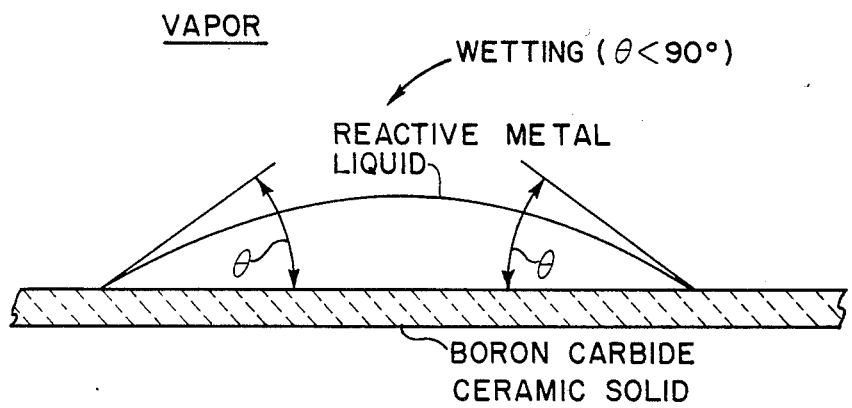
FIGS. 2A and B illustrates the wetting step in accordance with the invention.
Figure 2B:
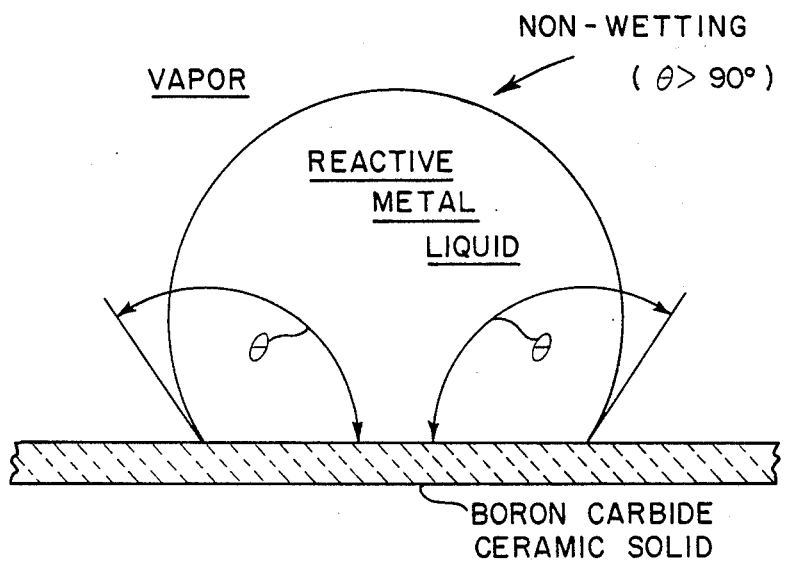

The mechanism of consolidation (kinetics of microstructural rearrangement) in boron-carbide-reactive metal cermets is very much dependent upon the phenomenon of reactive-liquid-phase sintering. For this phenomenon to occur, the capillarity-thermodynamic criterion of a low contact angle of the liquid-metal phase on the solid-boron-carbide-ceramic phase must be achieved. This condition is often referred to as wetting and is illustrated in FIG. 2A and B.

Wetting is defined as any process in which a solid-liquid interface is formed. The driving force for wetting is a reduction in free energy of the system, where system is defined as solid, liquid, and vapor phases that coexist.

Early thermodynamic treatments of wetting considered the solid, liquid, and vapor phases that coexist to be at chemical equilibrium. However, at elevated temperatures, boron-carbide-reactive-metal mixtures have solid, liquid, and vapor interfaces which are not at chemical equilibrium; hence, the term reactive metal is used in referring to these compositions. Under chemical nonequilibrium conditions, the effect of chemical reactions (reaction thermodynamics) on interfacial surface energies must be considered, because the phases of the solid, liquid, and vapor react with one another through the interface to achieve a state of chemical equilibrium. During these nonequilibrium dynamic conditions, the interfacial energies and the contact angle are continuously changing. This continues until the system reaches a state of chemical equilibrium.

Mass transfer across a ceramic-metal interface results in a net decrease in the free energy of the system. Mass transfer usually begins and continues during the sintering process until chemical equilibrium is reached. If the free energy of the system does not decrease, the reaction will not proceed. In boron-carbide-reactive-metal composites there is a tendency for the free energy to decrease and this results in the formation of certain reaction products.

Contact-angle measurements can be made to quantify this wetting phenomenon. This is easily done by heating the metal or alloy phase atop a polished substrate of the boron-carbide-ceramic phase. The contact angle is then measured either in situ or after heating and recording.

Figure 3:
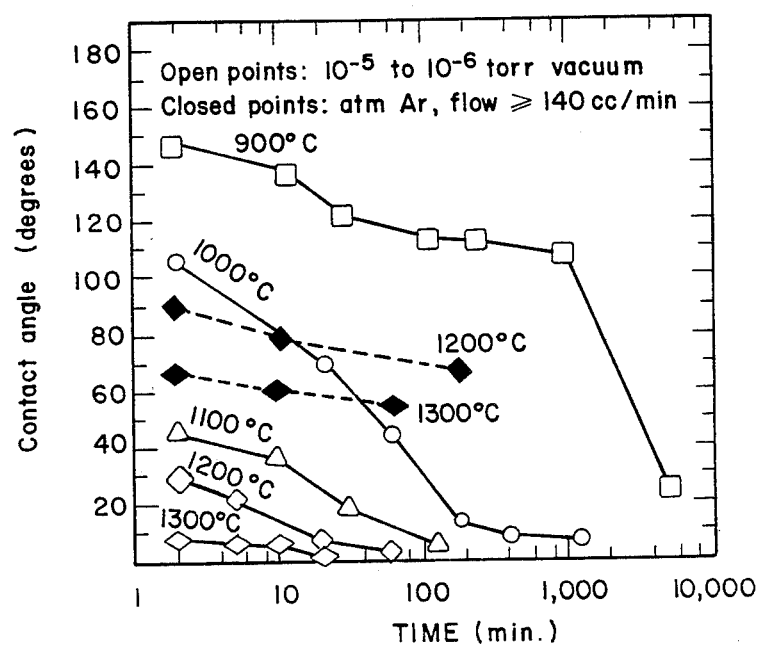
FIG. 3 is a graph of contact angle data for aluminum metal on a boron-carbide substrate.

As an example, contact-angle data for aluminum on a boron-carbide substrate is presented in FIG. 3 which shows the contact angle as a function of time for various temperatures, in either vacuum or an argon atmosphere. It is important to consider the parameters of temperature, time, and atmosphere when making contact-angle measurements. Without these three coupled variables, it is not possible to accurately replicate the conditions necessary to achieve a desired wetting condition. Processing temperatures for Al are in the range of about 1050° C. to about 1250° C.; processing times are typically about 2-10 minutes.

The time parameter is particularly important because boron-carbide-reactive-metal composites undergo mass transfer across their ceramic-metal interfaces. For example, under vacuum conditions, a microstructure resulting from a heat treatment of 900° C. for two minutes would be very weak because no interfacial reaction has been allowed to occur. These interfacial reactions are critical to the first step of this invention in ensuring that ceramic-metal-interfacial-bonding forces are maximized. Similarly, a microstructure resulting from a heat treatment of 1300° C. for 100 minutes under vacuum would also result in a very weak microstructure because too much interfacial reaction has been allowed to occur. That is, the reaction kinetics at the ceramic-metal interface were accelerated so greatly that no metal phase remains to give the composite any structural integrity.

The parameter of atmosphere is also important because the temperature-time curves for wetting behavior can be shifted. This can be significant, especially when the reactive metal phase has a low vapor pressure at certain processing isotherms.

The key point of the first step of this invention is that an intermediate temperature-time processing window must be chosen from the contact-angle data in order to ensure that good interfacial bonding is initially achieved while at the same time avoiding the complete depletion of the metal or alloy phase through evaporation or accelerated kinetics of reaction.

Reaction Thermodynamics

If reactive-liquid-phase sintering is to occur, the boron-carbide-metal mixture must satisfy the reaction-thermodynamic criterion that the solid-boron-carbide-ceramic phase and any metastable $Al_xB_yC_z$, $Al_xB_y$, $Al_xC_y$ compounds or solid solutions be partially soluble in the liquid metal or alloy phases present.

To fully understand how a particular boron-carbide-reactive-metal composite will react at different processing isotherms, one must consider the reaction series for that particular composition. Merely examining phase-equilibria data (i.e., B-C-metal, B-metal, and C-metal phase diagrams) is often times not enough. This is because these reactive-metal compositions often form metastable phases which are not evident from phase-equilibria data. In most cases, even the thermodynamic-equilibrium data is not available. Hence, detailed studies using X-ray diffraction, energy dispersive spectroscopy, optical and electron microscope/microprobe equipment must be employed. These studies must be performed at incremental steps during the composites' processing history to correctly determine the metastable and equilibrium reaction products that comprise each specific microstructure. These detailed studies result in a reaction-series map that can be used to tailor the microstructure. In addition, the reaction series map specifically defines the composition of matter obtained for any given heat treatment.

Processing the boron-carbide-reactive metal starting compositions according to the reaction-series map is step two of this invention. With it, selected material properties can be introduced by tailoring the reaction products that form the final microstructure. The reaction products can be taken to equilibrium phases or a metastable condition can be frozen into the microstructure.

Figure 4:
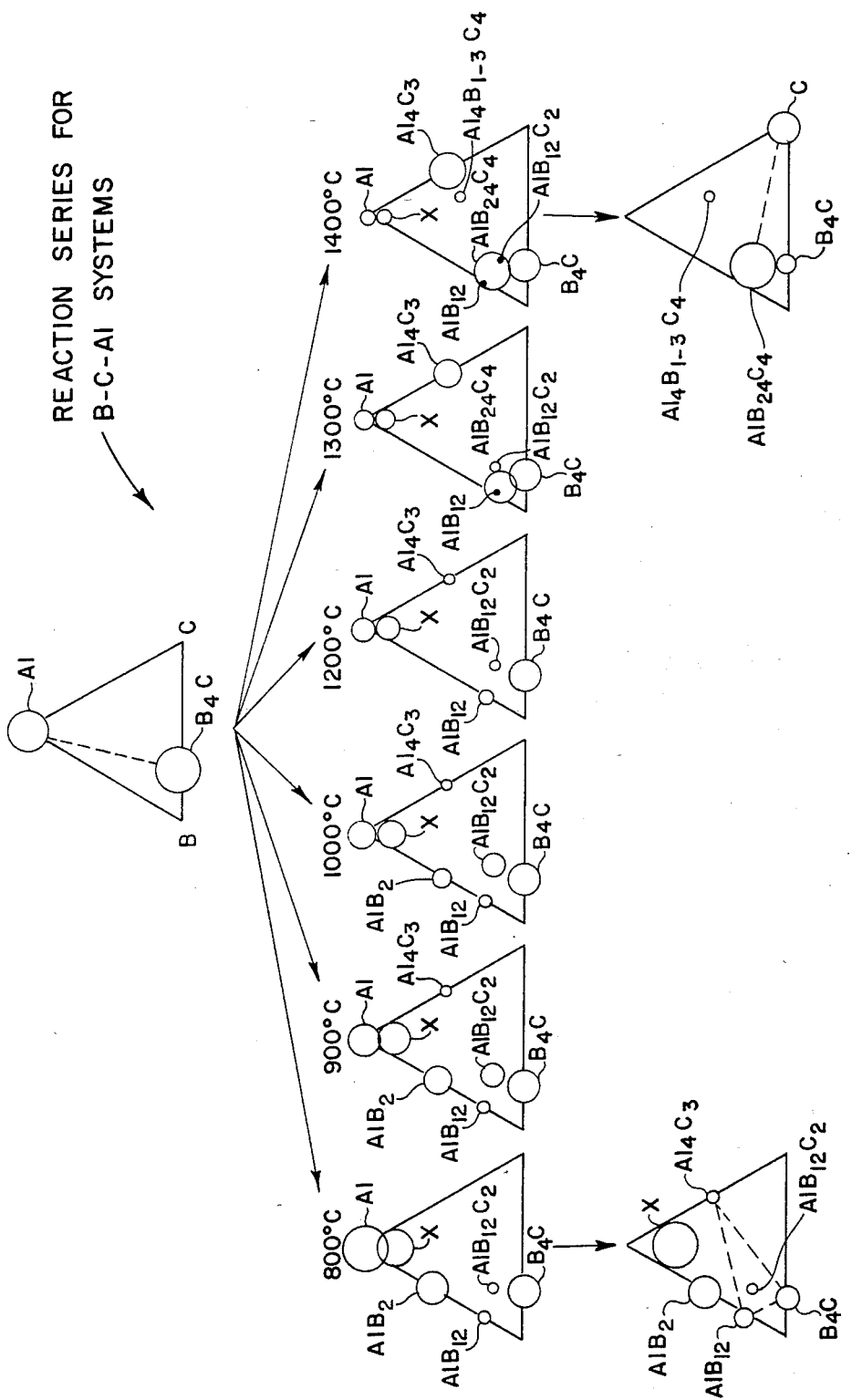
FIG. 4 is a reaction series map for boron-carbide aluminum graphically showing certain compositions which are produced according to the invention.
Figure 5:
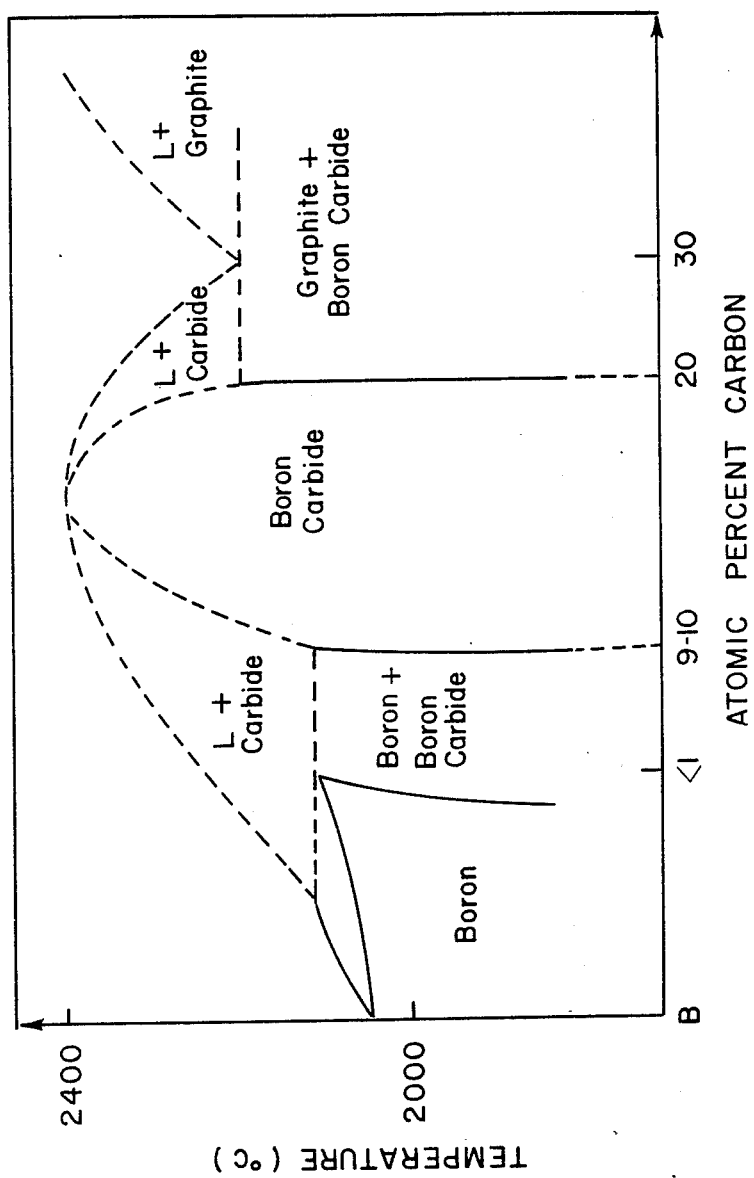
FIG. 5 illustrates the homogeneity range for boron-carbide.

The reaction-series map for boron-carbide-aluminum starting compositions is shown in FIG. 4. The initial mixture of boron-carbide and aluminum is shown at the top of the figure. Although boron-carbide is stoichiometrically indicated as $B_4C$, the use of other boron-carbide stoichiometries, or combinations thereof, is equally feasible. The range of boron-carbide stoichiometries is infinite and is illustrated by the homogeneity range for boron-carbide in FIG. 5. Specifically, this region of boron and carbon solid-solubility ranges from 9 to 20 atomic percent carbon.

Once the necessary capillarity-thermodynamic conditions of step one have been met, then the intimate contact between the phases present will allow for tailoring heat treatments using the reaction-series map. The reaction temperature is in the range of about 800° C. to about 1400° C. Reaction time can be quite short, e.g., about 10 minutes, or much longer, serveral hours or more, depending on the products desired.

The metastable and equilibrium reaction products that form from boron carbide-aluminum compositions undergoing heat treatments at 800° C., 900° C., 1000° C., 1200° C., 1300° C., and 1400° C. are shown in FIG. 4. As illustrated, none of the compositions of matter are comprised of a single phase or compound, but rather a local equilibrium is achieved between any three adjoining phases in the microstructure.

For example, heat treatment at 900° C. results in a microstructure made up of seven phases, the relative amounts of which are indicated by the size of the points on the B-C-Al ternary diagram. As another example, with heat treatment at 1300° C., only six phases are present in the microstructure; however, the chemistry of the composite has significantly been altered. The actual amount of aluminum and boron-carbide, of course, is dependent upon the starting-mixture ratio of these constituents. In general, at highter temperatures, greater than about 1200° C., a large starting composition of Al, greater than 50 Vol. % is necessary. When processing at lower temperatures, less than about 1200° C., much lower amounts of Al can be used. To produce a fully dense structure requires sufficient Al to fill all void spaces or pores in the microstructure.

Processing the starting materials in accordance with the steps described herein leads to the formation of an unidentified phase (phase X) in these composites. The exact structure of this new phase and its mechanical properties are not yet known. The existence of this phase has been confirmed and its X-ray diffraction pattern, which is an identifying signature, is shown in Table I. Preliminary results indicate that this phase may be of a new isotype in structure.

Summarizing the reaction series for the boron-carbide-aluminum composites covered under step two of this invention results in the compositions of matter shown in Table II.

FIG. 4 also shows two compositions of matter for heat treatments over extended periods of time. For example, an 800° C. extended heat treatment results in the same reaction products with only a shift in their relative amounts. Phase X is aluminum rich and after all the aluminum has reacted, this phase and eventually the $AlB_2$ and $AlB_{12}C_2$, will decompose to form the equilibrium products shown by the compatibility triangle (dashed line) of boron-carbide, $\alpha$-$AlB_{12}$, and $Al_4C_3$.

On the other hand, an extended heat treatment at 1400° C. results in not only a change in the relative amounts of phases present, but also in a change of the composites' chemistry. Thus, once the aluminum is depleted from the microstructure X, $Al_4C_3$ and the solid-solution $Al_4B_{1-3}C_4$ decompose to form the compatibility triangle of boron-carbide, $AlB_{24}C_4$, and carbon.

The key point of step two of this invention is that it is possible to tailor, to at least some degree, the microstructures of boron-carbide-reactive-metal composites. The usefulness of this is illustrated in Table III where the hardness values for the reaction products of a boron-carbide-aluminum cermet are given. Since hardness can be correlated with many other mechanical properties, it is evident that boron-carbide-reactive-metal composites offer structures with desirable mechanical properties imparted by the selection of the processing parameters.

Consolidation Before Firing

The third step, consolidation, is required to produce a fully dense microstructure, i.e., with negligible porosity. Although step three of this invention obviously precedes steps one and two in practice, it is very important to consider these other two steps to determine whether or not the boron-carbide-reactive-metal system will offer the microstructures and, in turn, the desired properties one is seeking for a particular application.

Boron-carbide-reactive-metal cermets can be hot-pressed or HIPped to full density providing the capillarity-thermodynamic criteria of step one is first attained in the microstructure. Without this, the pressure formed microstructure may be substantially weaker than one for which this condition was satisfied.

The high cost of capital equipment required for these pressure techniques oftentimes puts the manufacture of these composites at an economical disadvantage. One way to avoid this expense is to make it possible for these composites to achieve full density by reactive-liquid-phase sintering alone. To do this, the prefired green body of the composite must be properly prepared.

Proper preparation involves three steps: selection of the appropriate starting particle sizes, codispersion of the boron-carbide and reactive-metal powders, and consolidation of the codispersed powders in a very homogeneous and uniform manner.

Selection of the correct particle size is important because it directly affects the densification and reaction-thermodynamic kinetics. That is, larger boron-carbide starting powders (e.g., 5–50 $\mu$m in diameter) will have much less surface area available for reaction than submicron boron-carbide starting powders will have.

The larger powders, due to their lower surface area, will be kinetically slower during reactive-liquid-phase-sintering processes and, hence, have more time for microstructural rearrangement during firing. This added time can be a benefit toward achieving a higher density (i.e., lower porosity) in the fired bodies.

However, large starting constituents are not always desired because they can result in larger-grain-size composite microstructures which are typically not as strong as similar compositions with smaller-grain-size microstructures. More importantly, however, is the fact that prefire consolidation of these larger size starting constituents always leads to large inhomogeneities and nonuniformity in the unfired body or green body. This is the reason why conventional dry mixing, wet mixing, and ball milling techniques do not provide green bodies that can achieve full density by reactive-liquid-phase sintering alone. Hence, the need for the application of pressure.

Through the use of smaller starting size powders, e.g., less than 5 $\mu$m down to submicron average diameters, it is possible to achieve green bodies whose constituents are homogeneously and uniformly distributed. But more importantly, it is possible to achieve green-body microstructures with uniformly distributed defects (i.e., pores) which are small enough to be closed by the action of reactive-liquid-phase sintering alone, thereby negating the need for any external pressure application to achieve fully dense final composite bodies.

To achieve a homogeneously and uniformly consolidated green body requires that the starting constituent powders be classified, i.e., put into narrow size distributions. Classification can be done by air classifiers or continuous centrifuges. This is the first step to controlling the packing morphology of the prefired green body. For example, imagine the starting powders of boron-carbide and aluminum to be equal-sized ideal spheres. If every possible point in a volume of space is filled with a sphere during consolidation of the green body, then the maximum green density achievable is 74% of theoretical. This ideal-close packed density, however, still requires considerable rearrangement during firing to achieve full density. To improve the green density even further, it is possible to use still smaller-sized ideal spherical starting constituents which can fit into the interstices of the close-packed microstructure previously hypothesized. With this bimodal packing morphology, the distribution of porosity should be very uniform and much smaller than in the monosized green body. This ideal bimodal green body should have a prefire density greater than 90% of theoretical and, hence, require much less rearrangement during reactive-liquid-phase sintering to achieve full density.

The next step to controlling packing morphology is the codispersion of the starting constituents to ensure intimate mixing of the powders in a liquid suspension. As an ideal case, consider a condition where each suspended boron-carbide particle is adjacent to only suspended aluminum particles and each suspended aluminum particle is adjacent to only suspended boron-carbide particles. Although it is impossible to obtain this ideal case, it is possible to approach this condition by selecting an appropriate dispersing medium.

To codisperse boron-carbide and reactive-metal powders requires that the repulsive forces between both like powders and unlike powders be maximized. This ensures that a uniform and dense packing morphology will be obtained during prefire consolidation of the green body. To maximize compositional homogeneity and uniformity, it is important to agitate the codispersed starting powders, preferably by ultrasonic methods, e.g., ultrasonic probe or ultrasonic bath.

Methods of dispersion may be classified as electrostatic or steric or a combination of both. Electrostatic dispersion is based on controlling the charge associated with each particle and its surrounding fluid and is based on diffuse-double-layer theories. Steric dispersion involves the use of solvents or solvents and surfactants. Solvents may be classified as either polar or nonpolar. Surfactants may be classified as anionic, cationic, nonionic, or amphoteric. The nature of these surfactants and their typical structures is shown in Table IV, which shows typical surfactants which may be used in accordance with the invention.

The use of surfactants, which are partially soluble in a particular solvent, can allow the maximum repulsive forces between all particles to be achieved. This is due to adsorbed layers of polymer (surfactant) on the surface of each particle which protrude like extended fingers, pointing away from the surface of the particle. These fingers push on other fingers on adjacent particles during consolidation, thereby resulting in a homogeneous and uniform green body.

Ways to codisperse boron-carbide and aluminum starting powders include, but are not limited to, the use of methyl alcohol (a polar solvent) or the use of benzene, toluene, or carbon tetrachloride (nonpolar solvents) with a polybutene surfactant of about seventy carbon atoms attached to a succinic acid group which is reacted with diethylene triamine.

The final step in controlling packing morphology involves the actual consolidation of the solid constituents into the prefired green body. To do this, a method for removing the dispersion fluid must be used. Two methods of consolidation are possible; slip casting or centrifugal casting.

Slip casting is the simplest of the two methods and involves pouring the codispersed-solids-liquid mixture into a porous mold which is not soluble in the dispersing media. The mold can be shaped to provide for parts of desired geometries. The fluid is basically sucked from around the powders leaving them in a very uniform and homogeneous compositional state with a very uniform and homogeneous distribution of minimum size defects throughout the green body.

Centrifugal casting involves the use of a mold which is situated on a centrifuge. The centripetal acceleration causes higher-mass solids to consolidate in the bottom portion of the mold and the lower-mass liquid-dispersing fluid to be forced to the top of the mold. This fluid is later decanted off as unwanted supernant.

The use of low temperature binders may also be employed in the green body if it is found that the complex geometries being molded require greater green strength for handling.

Once the conditions for achieving the optimum packing morphology have been obtained, i.e., step three of this invention, then steps one and two of the invention should be employed to obtain a high density (i.e., low porosity) fired body with the desired microstructure for the application intended.

SUMMARY

Hard, yet potentially tough, lightweight boron-carbide-aluminum cermets can be manufactured by applying fundamental thermodynamic guidelines as processing principles and through the use of colloidal consolidation techniques. These techniques are applicable to other boron-carbide-reactive-metal compositions as well.

During the firing steps of these composites, sintering occurs by the formation of a reactive-liquid-metal phase in which the boron-carbide-ceramic phase is partially soluble. Nonequilibrium wetting conditions occur during firing due to chemical reactions at the boron-carbide metal-interfaces. These reactions cause a dynamic state in the surface energies of the solid, liquid, and vapor phases that coexist during heating; which, in turn, lowers the free energy of the system and results in spreading of the reactive-liquid-metal phase.

Only an optimum capillarity thermodynamic condition should be achieved in the composite before heat treating to the desired microstructural composition. This optimum condition allows the interfacial-bonding forces to be maximized at the ceramic-metal interface. In addition, this optimum condition allows for intimate contact between starting constituents, with a maximum of intimate contact occuring when the green body has been prepared through colloidal techniques. It is this maximization of interfacial-bonding forces and intimate phase contact which allows the individual phases, as produced through reaction thermodynamics, to contribute to the properties of the composite as a whole.

Figure 1:
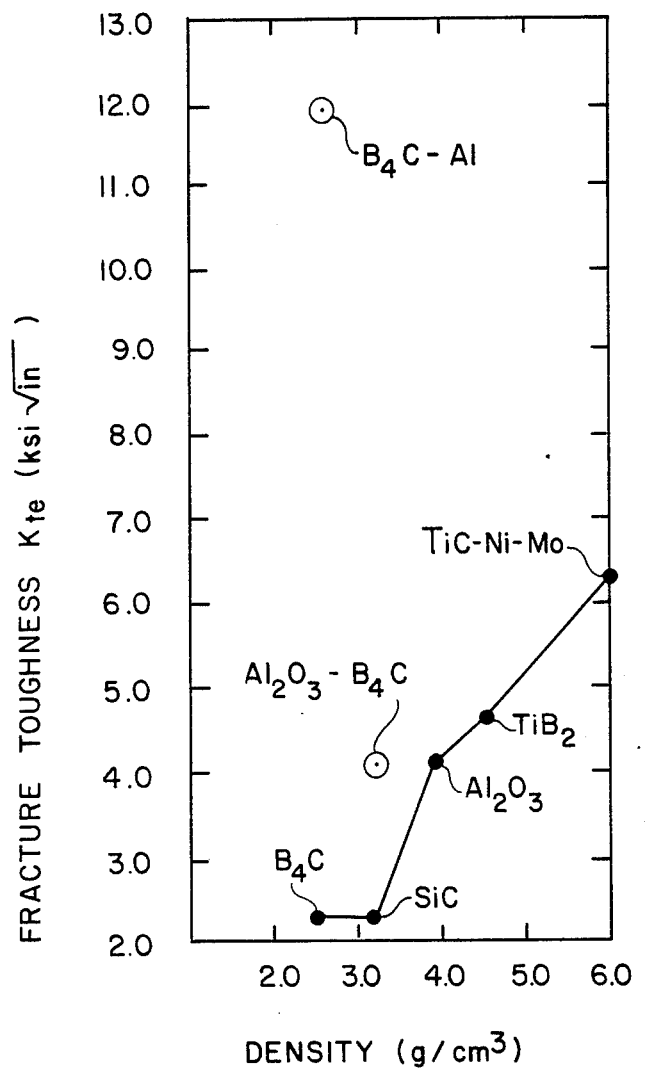
FIG. 1 is a graph of fracture toughness versus specific gravity for prior art ceramic materials and for cermet compositions according to the invention.

To date, microstructures of boron-carbide-aluminum cermets have been manufactured with modulus of rupture (MOR) exceeding 110 ksi and fracture toughness ($K_{IC}$) exceeding 12 ksi$\sqrt{in}$. FIG. 1 shows how these properties compare to various available prior art materials.

EXAMPLE I

Start with 5 micron average diameter 80 Vol. % $B_4C$ and 20 Vol. % Al. Wet mix in ethanol using ultrasonic probe. Slip cast in plaster of paris mold. Remove powders from mold and cold press at 10,000 psi. Remove pellet, place in furnace, heat to 1050° C. for 10 minutes. Reduce temperature to 800° C. and maintain for 24 hours. Result: Composite comprising

| | |
|---|---|
| 34 Vol. % | Phase X |
| 32 Vol. % | $B_4C$ |
| 23 Vol. % | $AlB_2$ |
| 5 Vol. % | Al |
| 3 Vol. % | $\alpha$-$AlB_{12}$ |
| 2 Vol. % | $Al_4C_3$ |
| 1 Vol. % | $AlB_{12}C_2$ |

EXAMPLE II

Start with 50 micron average diameter 30 Vol. % $B_4C$-70 Vol. % Al. Wet mix in methanol using ultrasonic probe. Slip cast in plaster of paris mold. Remove powders, cold press to 10,000 psi. Remove pellet, place in furnace, heat to 1220° C. for 5 minutes. Increase temperature to 1400° C. and maintain for 6 hours. Result:

| | |
|---|---|
| 42 Vol. % | Al |
| 15 Vol. % | $Al_4C_3$ |
| 13 Vol. % | $AlB_{24}C_4$ |
| 11 Vol. % | $B_4C$ |
| 9 Vol. % | $Al_4B_{1-3}C_4$ |
| 7 Vol. % | Phase X |
| 3 Vol. % | Other ($AlB_{12}C_2$, $\alpha$-$AlB_{12}$, C) |

Changes and modifications in the specifically described embodiments can be carried out without departing from the scope of the invention which is intended to be limited only by the scope of the appended claims.

TABLE I

| | Aluminum Rich Phase, X | | | | |
|---|---|---|---|---|---|
| $d_{Observed}$(Å) | $d_{Calculated}$(Å) | $I/I_o$ | h | k | l |
| Hidden | 3.8822 | Hidden | 0 | 0 | 3 |
| 2.964 | 2.950 | 100 | 1 | 0 | 1 |
| 2.714 | 2.702 | 50 | 1 | 0 | 2 |
| 2.1071 | 2.109 | 45 | 1 | 0 | 4 |
| 1.9411 | 1.9467 | 20 | 0 | 0 | 6 |
| 1.8547 | 1.8542 | 30 | 1 — | 0 | 5 |
| 1.7585 | 1.7600 | 70 | 1 | 1 | 0 |
| 1.2991 | 1.2978 | 25 | 0 | 0 | 9 |

Intermediate structure between hexagonal and rhombohedral
a = 3.52 Å
c = 11.68 Å

TABLE II

Compositions of Matter for Boron-Carbide-Aluminum-Cermets

| Heat Treatment Temp. | Composition of Matter* |
|---|---|
| 800° C. | X, $AlB_2$, $\alpha$-$AlB_{12}$, $AlB_{12}C_2$, $Al_4C_3$ |
| 900° C. | X, $AlB_2$, $\alpha$-$AlB_{12}$, $AlB_{12}C_2$, $Al_4C_3$ |
| 1000° C. | X, $AlB_2$, $\alpha$-$AlB_{12}$, $AlB_{12}C_2$, $Al_4C_3$ |
| 1100° C. | X, $AlB_2$, $\alpha$-$AlB_{12}$, $AlB_{12}C_2$, $Al_4C_3$ |
| 1200° C. | X, $\alpha$-$AlB_{12}$, $AlB_{12}C_2$, $Al_4C_3$ |
| 1300° C. | X, $\alpha$-$AlB_{12}$, $AlB_{12}C_2$, $Al_4C_3$, $AlB_{24}C_4$, |
| 1400° C. | X, $\alpha$-$AlB_{12}$, $AlB_{12}C_2$, $Al_4C_3$, $AlB_{24}C_4$ $Al_4B_{1-3}C_4$ |

*in addition to boron-carbide and aluminum or any alloys thereof or free carbon.
Note:
Trace amounts of B—C—Al other phases can also be present.

TABLE III

| Phase | Microhardness (kg/mm²) | Density (g/cm³) |
|---|---|---|
| $B_4C$ | 2750–4950 | 2.52 |
| $AlB_2$ | 980 | 3.16 |
| $\alpha$-$AlB_{12}$ | 2600 | 2.56 |
| $AlB_{24}C_4$ ($AlB_{10}$) | 2530–2650 | 2.54 |
| $AlB_{12}C_2$ | — | 2.63 |
| $Al_4C_3$ | — | 2.93 |
| Al | 19 | 2.70 |

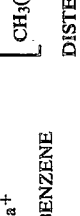

We claim:

1. A composition of matter, comprising a boron-carbide-aluminum composite with a tailored microstructure having at least four of any of the following phases:
   (a) $AlB_2$,
   (b) $\alpha$-$AlB_{12}$,
   (c) $AlB_{12}C_2$,
   (d) $Al_4C_3$,
   (e) $AlB_{24}C_4$,
   (f) $Al_4B_{1-3}C_4$,
   (g) a phase containing boron, carbon and aluminum and exhibiting an X-ray diffraction pattern shown in Table I,
   (h) $B_4C$, and
   (i) an aluminum phase, homogeneously distributed in the composite.

2. The composition of claim 1 wherein adhesive forces at ceramic-metal interfaces in the composite are substantially maximized.

3. The composition of claim 1 including a phase containing boron, carbon, and aluminum, and exhibiting a X-ray diffraction pattern shown in Table I.

4. The composition of claim 1 including at least the following five phases: $AlB_2$, $\alpha$-$AlB_{12}$, $AlB_{12}C_2$, $Al_4C_3$, and a phase containing boron, carbon and aluminum and exhibiting an X-ray diffraction pattern shown in Table I.

5. The composition of claim 1 wherein the composite is substantially fully dense.

6. The composition of claim 2 wherein the composite is substantially fully dense.

7. The composition of claim 3 wherein the composite is substantially fully dense.

8. The composition of claim 4 wherein the composite is substantially fully dense.

9. A composition containing boron, carbon, and aluminum, and exhibiting a X-ray diffraction pattern shown in Table I.

10. A composition of matter comprising a composite of boron-carbide and a metal reactive with boron-carbide, and having a plurality of ceramic phases homogeneously distributed in metal phases, said metal being selected from the group consisting of Al, As, Ba, Be, Ca, Co, Cr, Fe, Hf, Ir, La, Li, Mg, Mn, Mo, Na, Nb, Ni, Os, Pd, Pt, Pu, Re, Rh, Ru, Sc, Si, Sr, Ta, Tc, Th, Ti, U, V, W, Y, and Zr, and alloys thereof, and compounds thereof which are reduced to the metallic form during processing.

11. The composition of claim 10 wherein adhesive forces at ceramic-metal interfaces in the composite are substantially maximized.

12. The composition of claim 10 wherein the composite is substantially fully dense.

13. An article of manufacture comprising a structural element formed of a composition according to claim 1.

14. An article of manufacture comprising a structural element formed of a composition according to claim 4.

15. An article of manufacture comprising a structural element formed of a composition according to claim 8.

16. An article of manufacture comprising a structural element formed of a composition according to claim 12.

17. A method for producing a boron-carbide-reactive metal composite, comprising:
   wetting boron-carbide with a metal reactive with boron-carbide, or with an alloy thereof, or with a compound thereof which is reduced to the metallic form during processing;
   reacting the boron-carbide and metal to produce a multiphase microstructure wherein ceramic phases are homogeneously distributed in metallic phases and adhesive forces at ceramic-metal interfaces in the composite are substantially maximized.

18. The method of claim 17 wherein the metal is selected from the group consisting of Al, As, Ba, Be, Ca, Co, Cr, Fe, Hf, Ir, La, Li, Mg, Mn, Mo, Na, Nb, Ni, Os, Pd, Pt, Pu, Re, Rh, Ru, Sc, Si, Sr, Ta, Tc, Th, Ti, U, V, W, Y, and Zr.

19. The method of claim 18 wherein the metal is Al.

20. The method of claim 19 wherein the step of wetting is performed by heating to a temperature of about 1050° C.–1250° C.

21. The method of claim 20 comprising heating for about 2–10 minutes.

22. The method of claim 19 wherein the step of reacting is performed by heating to a temperature of about 800° C.–1400° C.

23. The method of claim 22 comprising heating for at least about 10 minutes.

24. The method of claim 17 further comprising:
   consolidating the boron-carbide and reactive metal substantially homogeneously prior to wetting and reacting.

25. The method of claim 24 wherein the step of consolidating is performed by:
   forming the boron-carbide and metal into particles of preselected sizes;
   codispersing the particles;
   consolidating the codispersed particles.

26. The method of claim 25 wherein the particles are formed in a size range of about 50 microns to less than 1 micron.

27. The method of claim 26 including forming the particles into at least two substantially different sizes.

28. The method of claim 25 wherein the step of codispersing is performed by placing the particles in a solvent.

29. The method of claim 28 further including adding a surfactant to the solvent.

30. The method of claim 28 for aluminum wherein the solvent is methyl alcohol, benzene, toluene, or carbon tetrachloride.

31. The method of claim 25 wherein the step of consolidating the codispersed particles is performed by slip casting.

32. The method of claim 25 wherein the step of consolidating the codispersed particles is performed by centrifugal casting.

33. A method for consolidating boron-carbide and aluminum particles, comprising:
   forming the boron-carbide and aluminum into particles of preselected sizes;
   codispersing the particles;
   consolidating the codispersed particles.

34. The method of claim 33 wherein the step of codispersing is performed by placing the particles in a solvent.

35. The method of claim 34 further including adding a sufactant to the solvent.

36. The method of claim 33 wherein the step of consolidating the particles is performed by slip casting.

37. The method of claim 33 wherein the step of consolidating the particles is performed by centrifugal casting.

38. The composition of claim 1 wherein the aluminum phase is selected from aluminum, aluminum alloys, or aluminum compounds which are reduced to aluminum during formation of the composite.

39. The composition of claim 4 further including at least one of the following: B$_4$C and Al.

40. The composition of claim 1 having a fracture toughness of at least about 12 ksi$\sqrt{\text{in}}$.

41. The composition of claim 1 having a modulus of rupture of at least about 110 ksi.

42. The composition of claim 1 wherein the relative proportions of the phases is selectable as a function of reaction temperature and reaction time during formation of the composite.

* * * * *